April 17, 1951     J. P. TRUSCOTT     2,549,144
MOLDING APPARATUS AND METHOD FOR
REMOVING CREEP FROM RUBBER
Filed May 12, 1948     2 Sheets-Sheet 1
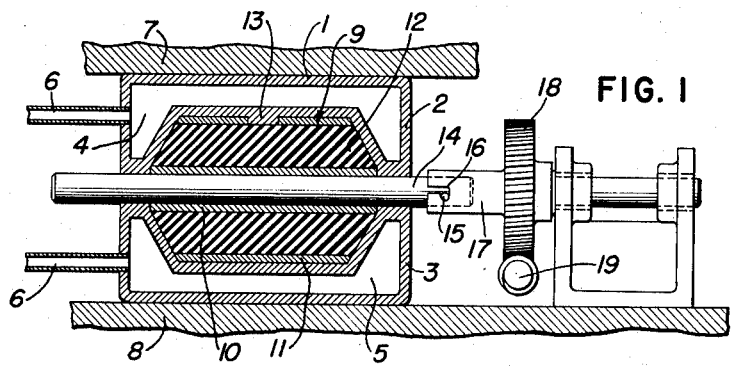
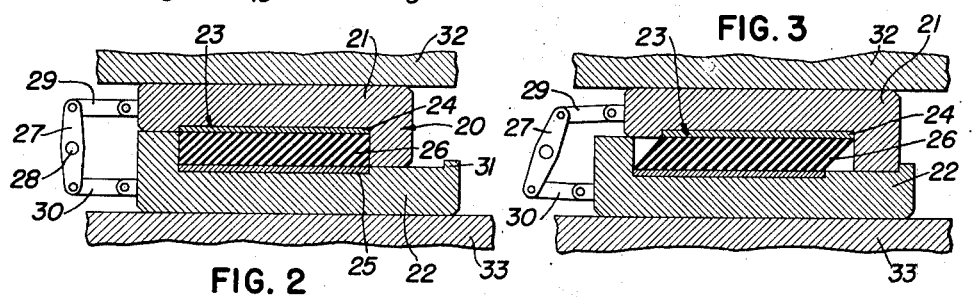
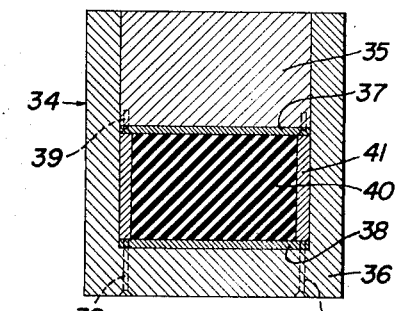
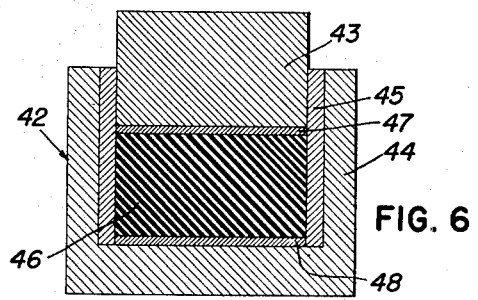
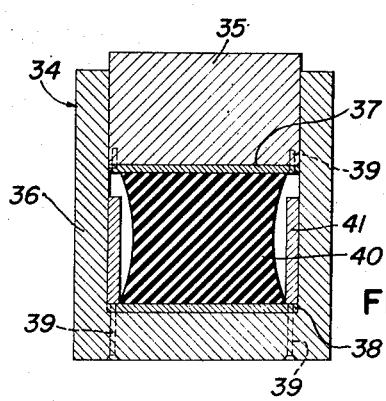
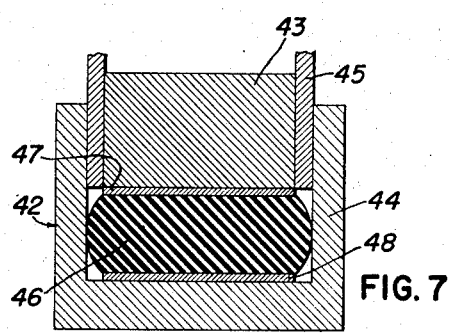
INVENTOR.
JOHN P. TRUSCOTT
BY
ATTORNEY April 17, 1951          J. P. TRUSCOTT          2,549,144
          MOLDING APPARATUS AND METHOD FOR
                REMOVING CREEP FROM RUBBER
Filed May 12, 1948                                    2 Sheets-Sheet 2

INVENTOR.
JOHN P. TRUSCOTT
BY
*RMYates*
ATTORNEY

Patented Apr. 17, 1951

2,549,144

UNITED STATES PATENT OFFICE 2,549,144

MOLDING APPARATUS AND METHOD FOR REMOVING CREEP FROM RUBBER

John P. Truscott, Akron, Ohio, assignor to Wingfoot Corporation, Akron, Ohio, a corporation of Delaware Application May 12, 1948, Serial No. 26,486

21 Claims. (Cl. 18—34)

The present invention relates to a method of reducing creep or drift in the rubber of a molded assembly in which the load is to be carried by rubber or rubber-like material under stress. Assemblies, such as these, are used so that the rubber is usually stressed in shear, compression, tension, torsion or a combination of these stresses, and this invention relates to a method of subjecting, before the assembly is removed from the mold, the rubber portion of the assembly to stresses similar to those stresses that it will be subjected to under actual working conditions.

A particular object of this invention is to provide means in the mold for subjecting the rubber of the assembly to a stress similar to that encountered in service without removing the assembly from the mold after the vulcanization of the rubber in order that the stressed rubber may be subjected to further treatment for the removal of or to effect a substantial reduction in the creep or drift.

Another object of the present invention is to provide a simple means for subjecting the rubber elements of similar assemblies to like amounts of stress and also to a stress similar to that which they are to be subjected to in service without removing the assembly from the mold.

Another object of the invention is to provide means for retaining the rubber in a stressed condition while subjecting it to additional treatment.

Another object of this invention is to provide means for stressing the rubber immediately after at least partial vulcanization without removing the assembly from the mold. Thus, the residual heat of vulcanization has not been dissipated and is used to advantage for the additional treatment or care of the assembly while the rubber is in the stressed position.

Another object of this invention is to eliminate the need of additional or extra equipment for further treatment of the rubber to eliminate or reduce the creep in the rubber.

Another object of this invention is to materially reduce the time necessary for such additional treatment by utilizing the residual heat of vulcanization so that time required to completely treat an assembly is materially reduced and the efficiency of the entire process is increased.

Other objects of this invention will appear hereinafter as the description thereof proceeds, the novel features, arrangements and combinations being clearly pointed out in the specification and in the claims thereunto appended.

In the drawings:

Fig. 1 is a vertical section of one embodiment of the invention;

Fig. 2 is a vertical section of another embodiment of the invention;

Fig. 3 is a vertical section of the embodiment shown in Fig. 2 with the parts in a different position;

Fig. 4 is a vertical section of a further embodiment of the invention;

Fig. 5 is a vertical section of the embodiment shown in Fig. 4 with the parts in a different position;

Fig. 6 is a vertical section of a still further embodiment of the invention;

Fig. 7 is a vertical section of the embodiment shown in Fig. 6 with the parts in a different position;

Figure 8:
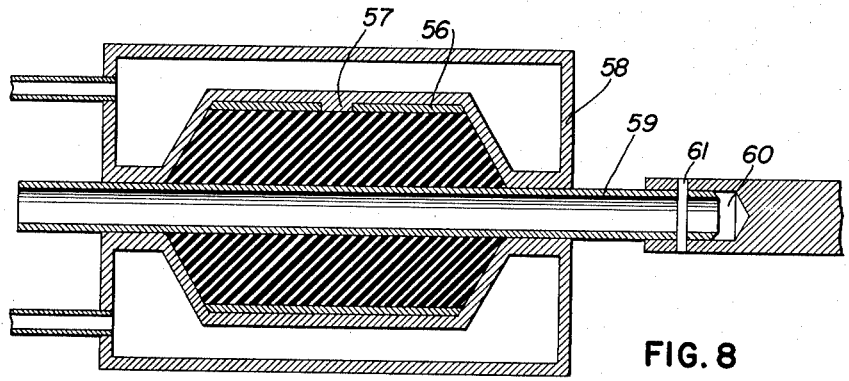
Fig. 8 is a vertical section of a modification of the embodiment of the invention shown in Fig. 1.

It is well known fact that rubber will creep or drift under load and acquire a permanent set; thus the load is not satisfactorily supported without additional and frequent adjustments. It is also well known that this creep or drift may be materially reduced after the rubber is at least partially vulcanized by subjecting the rubber before use to pre-stressing in the same manner and direction as is to be stressed in service. The rubber in the pre-stressed condition is then subjected to additional heat treatment and then released from that stressed position. By this treatment, the rubber acquires a permanent set in the direction of the applied stress and comes into equilibrium at a point between the stressed position and the unstressed position.

In numerous applications of this principle, the pre-stressing and treatment is accomplished by the use of separate and special equipment after the assembly has been removed from the mold subsequent to the vulcanization or partial vulcanization, and because of this, the residual heat of vulcanization is partially or entirely dissipated before the treatment is begun. This invention is an improvement over the previous practice in that it utilizes the residual heat of vulcanization and the mold itself for pre-stressing the rubber assembly, reducing the time required and the amount of equipment needed.

In Fig. 1, the mold 1 is of the conventional type for torsion type mountings, and as illustrated, comprises sections 2 and 3 which are provided with steam chambers 4 and 5 into which the steam is supplied by the conduits 6. The mold 1 may be interposed between two relatively unyielding surfaces 7 and 8, if desired; for example, the platens of a hydraulic press, or any other well known means may be provided for maintaining the sections 2 and 3 in their proper position.

The rubber assembly 9 comprises an inner sleeve 10 and an outer sleeve 11 with body of rubber 12 interposed between and adhered or bonded to the sleeves 10 and 11. The outer sleeve 11, as illustrated, is interlocked with the mold 2 by means of projection 13 on the mold extending into an opening in the sleeve 11, and similarly the inner sleeve 10 is interlocked with the pin 14 as by a splined connection, the pin being inserted before the molding operation or thereafter. The means of interlocking the sleeves 10 and 11 with their respective mating parts of the mold are only illustrative but any means can be used to accomplish this interlocking. The cross pin 15 is fixed to the pin 14 and engages the bayonet slot 16 of the hollow sleeve 17 which carries worm gear 18. The worm 19, which is driven by any suitable mechanism or by hand, rotates the gear 18 which in turn rotates the shaft 14, thus, in turn rotates the sleeve 10 of the rubber assembly 9 relative to sleeve 11 which torsionally stresses the rubber 12. The rotation of the sleeve 10 is in the direction that will torsionally stress the rubber in the same manner as it is to be stressed in service.

After the rubber assembly 9 is subjected to vulcanization until at least the optimum vulcanization of the rubber 12 is accomplished, the pin 14 is inserted (if it has not been in place during the molding operation) and attached to the worm gear 18 as previously described. The worm 19 is then rotated in the proper direction and the pre-determined angular distance, to subject the rubber 12 to the desired torsional stress for treatment. The rubber at this point retains the residual heat of vulcanization and the application of heat to the mold 1 is preferably continued, but at a temperature below that which is deteriorating to the rubber 12. This moderated temperature may be obtained by circulating a mixture of steam and air through the steam chambers 4 and 5 of the mold 1, resulting in a partial steam pressure and a lower temperature which is well known practice in the art. This treatment is continued for a pre-determined length of time and preferably, but not essentially, allowed to cool down while in this stressed position; then when the stress on the rubber 12 is released, the rubber will only partially return to its original molded position due to the rubber having taken a permanent set, and, as a result, the creep in the rubber under load will be relatively small in actual use.

In Figs. 2 and 3, another embodiment of the invention is shown in which a mold 20 of the conventional type for shear or sandwich type assemblies, comprises sections 21 and 22 forming a confined space or cavity for the shear assembly 23 composed of plates 24 and 25, respectively, with the rubber 26 interposed between and adhered to the plates 24 and 25. As illustrated, the mold sections 21 and 22 are recessed to receive the plates 24 and 25, to prevent their movement relative to their respective mating mold sections, but any well known means may be employed to prevent this movement of the plates 24 and 25.

After the shear assembly 23 is molded in the usual manner, sections 21 and 22 are moved relative to each other in parallel planes causing a shear stress to be placed on the rubber 26 as shown in Fig. 3. By way of example, the toggle link 27 is pivotally mounted on pin 28 and pivotally connected to the links 29 and 30 which in turn are pivotally connected to the mold sections 21 and 22 respectively. By rotating the toggle link 27 in a clockwise direction, the mold sections 21 and 22 are moved into the position shown in Fig. 3. For the purpose of illustration, a projection 31 on mold section 22 is employed to limit the parallel movement of the mold section 21 with respect to section 22, thus providing positive means for uniformly stressing the rubber of successive assemblies. The mold 20 may be interposed between two relatively rigid and unyielding surfaces 32 and 33 to prevent separation of the sections 21 and 22 and, if desired, to retain the sections in their changed position for further treatment of the stressed rubber. Any other means may be used for these purposes such as providing guide means and locking means on the mold sections 21 and 22 themselves. The entire assembly is then subjected to a heat treatment as previously described in the reference to the first embodiment. The plates 24 and 25 of the assembly 23 tend to return to their original position shown in Fig. 2 but will only partially return due to the permanent set in the rubber 26.

Figs. 4 and 5 show a further embodiment of this invention in which means are provided to treat the rubber for creep reduction when it is to be subjected to tension stresses. The mold 34 comprises sections 35 and 36 to which plates 37 and 38 are fastened by any well known means such as removable screws 39, and rubber 40 is interposed between and adhered to plates 37 and 38. A removable section 41 is provided to prevent the screws 39 from being covered with rubber during the molding operation and to shape the rubber.

After the tension assembly is molded in the conventional manner, the mold section 35 is moved away from mold section 36 the desired distance, thus subjecting the rubber 40 to a tensile stress. The entire assembly is then subjected to an additional heat treatment as previously described. Afterwards, the stress is released and the assembly removed from the mold. Any suitable means may be used in place of screws 39 to hold the plates as described.

Figs. 6 and 7 show a still further embodiment of the invention in which means are shown to treat the rubber for creep reduction when it is to be subjected to compression stresses in use. The mold 42 comprises sections 43 and 44 and a removable sleeve 45 which, in conjunction with mold section 43, fits in mold section 44 to form the mold cavity for the compression assembly comprising rubber 46 interposed between and adhered to plates 47 and 48.

After the compression assembly is molded in the conventional manner, the sleeve 45 is moved upwards to the position shown in Fig. 7 or removed entirely, if desired, and then the mold section 43 is moved towards section 44 to place the rubber 46 under the desired compression stress and then retained in that position. The entire mold assembly is then subjected to additional heat treatment in a manner similar to the previously described embodiments and subsequently the stress is released and the rubber tends to revert to its original position.

Figures 9, 10:
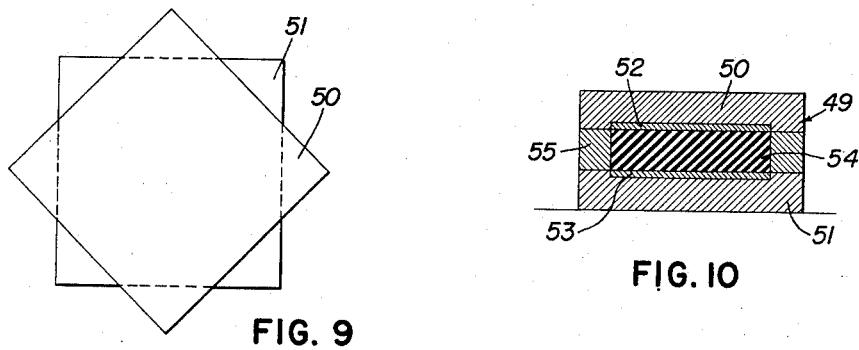
Fig. 9 is a plan view of a further embodiment of the invention.
Fig. 10 is a vertical section of the embodiment shown in Fig. 9 with the parts in a different position.

Figs. 9 and 10 show another embodiment of the invention in which means are provided to treat the rubber for creep reduction in a sandwich type assembly when it is to be subjected to torsional stresses. The mold 49 comprises sections 50 and 51, which are recessed to receive the plates 52 and 53 of the sandwich assembly and the rubber 54 is interposed and adhered thereto. Section 55 is an intermediate section of the mold separating the sections 50 and 51 and forming the mold cavity. The intermediate section 55 is made in sections if the periphery of the rubber 54 in the finished sandwich assembly is any shape other than circular, so that the section 55 may be removed after the molding operation before treatment to prevent interference with the stressing of the rubber.

After the molding operation is completed, the intermediate section 55 is removed, if necessary, and the sections 50 and 51 are rotated the required angular distance in parallel planes and then retained in that position. The entire mold assembly is then subjected to an additional heat treatment as previously described with reference to the embodiment shown in Fig. 1, and when the stress is released the rubber tends to revert to its original position.

Fig. 8 shows a modification of the embodiment shown in Fig. 1 in which the outer sleeve 56 is interlocked with the mold 58 by means of projection 57 on the mold extending into an opening in the sleeve 56. The inner sleeve 59 of the torsion assembly extends beyond the mold 58 into a hollow shaft 60 to which the sleeve 59 is connected by means of pin 61. It will be understood that the hollow shaft will be rotated by suitable mechanism such as that illustrated in Fig. 1.

Figure 11:
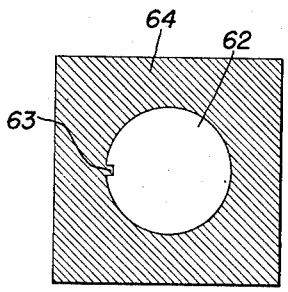
Fig. 11 is a sectional plan view of a modification of the embodiment shown in Figs. 9 and 10.

Fig. 11 is a modification of the embodiment shown in Figs. 9 and 10 in which the sandwich type assembly is circular and the plates 62 of the assembly are notched to receive the projections 63 on the upper and lower sections of the mold 64 so as to cause the plates to rotate with their respective mating mold sections when stressing the rubber preparatory to additional treatment.

It is to be understood that the operation of subjecting the complete mold assembly to an additional heat treatment with the rubber being subjected to stress after at least partial vulcanization may be done in the same apparatus that furnishes the vulcanizing heat or by any other means that is suitable for the purpose, for example, immersion in water of the proper temperature for the required time or by the use of electronics. It is to be understood that this operation can take place after the complete vulcanization of the rubber or after only a partial vulcanization thereof. In the latter case the vulcanization of the rubber is completed by the additional heat treatment as well as a material or complete reduction of the creep under load.

It is to be understood that when the specification refers to the fact that after the treatment the rubber tends to revert to its original position, the actual return will only be partial as the rubber takes up a permanent set somewhere between the position it had in final treatment and its original position.

Although I have herein disclosed specific embodiments of my invention, I do not intend to limit myself thereto, but to include all of the obvious variations and modifications falling within the spirit and scope of the specification and the appended claims.

Having thus fully described my invention, what I claim and desire to secure by Letters Patent of the United States is:

1. The method of reducing creep in an assembly comprising rubber interposed between and adhered to spaced opposed and relatively movable members, the steps of locating the members and rubber in a mold for vulcanization, at least partially vulcanizing the rubber, subjecting the rubber to stress by moving said members relative to each other while in the mold before the residual heat of vulcanization is dissipated, retaining the rubber in this stressed condition, and subjecting the mold and assembly to additional heat for further treatment of the rubber while in this stressed condition.

2. The method of reducing creep in an assembly comprising rubber interposed between and adhered to spaced opposed and relatively movable members, the steps of locating the members and rubber in the mold for vulcanization, vulcanizing said rubber, subjecting the rubber to stress by moving said members relative to each other while in the mold before the residual heat of vulcanization is dissipated, retaining the rubber in this stressed condition, and subjecting said mold and assembly to additional heat for further treatment of the rubber while in this stressed condition.

3. The method of reducing creep in an assembly comprising rubber interposed between and adhered to spaced opposed and relatively movable members, the steps of locating the members and rubber in a mold for vulcanization, at least partially vulcanizing the rubber, subjecting the rubber to stress by moving said members relative to each other while in the mold before the residual heat of vulcanization is dissipated, retaining the rubber in this stressed condition, and allowing the residual heat of vulcanization to dissipate while the rubber is in this stressed condition.

4. The method of reducing creep in an assembly comprising rubber interposed between and adhered to spaced opposed and relatively movable members, the steps of locating the members and rubber in the mold for vulcanization, at least partially vulcanizing said rubber, subjecting the rubber to stress by moving said members relative to each other while in the mold before the residual heat of vulcanization is dissipated, retaining the rubber in this stressed condition, and retarding the rate of dissipation of residual heat of vulcanization while the rubber is in this stressed condition.

5. The method of reducing creep in an assembly comprising rubber interposed between and adhered to spaced opposed and relatively movable members, the steps of locating the members and rubber in a mold for vulcanization, partially vulcanizing said rubber, subjecting the rubber to stress by moving said members relative to each other while in the mold before the residual heat of vulcanization is dissipated, retaining the rubber in this stressed condition, and completing the vulcanization while the rubber is in this stressed condition.

6. The method of reducing creep in an assembly comprising rubber interposed between and adhered to spaced opposed and relatively movable members, the steps of locating the members and rubber in a mold for vulcanization, partially vulcanizing said rubber, subjecting the rubber to stress by moving said members relative to each other while in the mold before the residual heat of vulcanization is dissipated, retaining the rubber in this stressed condition, completing the vulcanization while the rubber is in this stressed condition, and retarding the rate of dissipation of residual heat of vulcanization while the rubber is in this stressed condition.

7. The method of reducing creep in a molded rubber assembly formed in a mold of at least two sections, the steps of vulcanizing the rubber in said mold to at least the optimum, subjecting the rubber to stress by moving said mold sections relative to each other while spaced portions of the rubber are retained in fixed relation to its adjacent mold section, maintaining the rubber in this stressed position and subjecting the mold and rubber to additional heat for further treatment of the rubber while in this stressed condition.

8. The method of reducing creep in a molded rubber assembly formed in a mold of at least two sections, the steps of vulcanizing the rubber in said mold to at least the optimum, subjecting the rubber to stress by moving said mold sections relative to each other while spaced portions of the rubber are retained in fixed relation to its adjacent mold section, maintaining the rubber in this stressed position and allowing the residual heat of vulcanization to dissipate while the rubber is in this stressed condition.

9. The method of reducing creep in a molded rubber assembly formed in a mold of at least two sections, the steps of vulcanizing the rubber in said mold to at least the optimum, subjecting the rubber to stress by moving said mold sections relative to each other while spaced portions of the rubber are retained in fixed relation to its adjacent mold section, maintaining the rubber in this stressed position and retarding the rate of dissipation of residual heat of vulcanization while the rubber is in this stressed condition.

10. The method of reducing creep in a rubber assembly formed in a mold of at least two sections, the steps of vulcanizing the rubber in said mold to at least the optimum, subjecting the rubber to stress by moving said mold sections relative to each other while spaced portions of the rubber are retained in fixed relation to its adjacent mold section, maintaining the rubber in this stressed position, and completing the vulcanization while the rubber is in this stressed condition.

11. A molding apparatus of the class described for reducing the creep in assemblies formed of rubber interposed between and adhered to spaced opposed rigid members, comprising at least two mold sections movable with respect to each other, means in at least two of said mold sections adapted to engage respectively with different ones of said rigid members to interlock therewith and to actuate said members when said mold sections are moved relatively to each other, means for moving said mold sections relative to each other while still retaining a closed cavity formed by the mold sections to thereby cause relative movement of said rigid members with respect to each other, thus subjecting the rubber to a stress in the direction of said relative movement, and means for retaining said mold sections and rigid members in this position for further treatment of the rubber.

12. A molding apparatus as defined in claim 11 in which the rigid members are capable of rotative movement with respect to each other and in which the mold sections are mounted for rotative movement.

13. A molding apparatus as defined in claim 11 in which the rigid members are capable of movement away from each other and in which the mold sections are mounted for movement away from each other after the rubber in the assembly has been at least partially vulcanized.

14. A molding apparatus as defined in claim 11 in which the rigid members are capable of movement toward each other and in which the mold sections are mounted for movement toward each other after the rubber in the assembly has been at least partially vulcanized.

15. A molding apparatus as defined in claim 11 in which the rigid members are capable of movement with respect to each other and in which the mold sections are mounted for translation after the rubber in the assembly has been at least partially vulcanized.

16. A molding apparatus of the class described for reducing torsional creep in assemblies formed of rubber interposed between and adhered to spaced opposed rigid members, comprising at least two mold sections rotatable with respect to each other, means in at least two of said mold sections adapted to engage respectively with different ones of said rigid members to interlock therewith and to actuate said members when said mold sections are rotated relatively to each other while still retaining a closed cavity formed by the mold sections, and gearing for rotating said mold.

17. A device as set forth in claim 16 in which the gearing comprises a worm wheel and worm gear and means for actuating them.

18. The method of reducing creep in an assembly comprising rubber interposed between and adhered to spaced opposed and relatively movable members, the steps of locating the members and rubber in the mold for vulcanization, vulcanizing said rubber, subjecting the rubber to shearing stress by moving said members relative to each other while in the mold before the residual heat of vulcanization is dissipated, retaining the rubber in this stressed condition, and subjecting said mold and assembly to additional heat for further treatment of the rubber while in this stressed condition.

19. The method of reducing creep in an assembly comprising rubber interposed between and adhered to spaced opposed and relatively movable members, the steps of locating the members and rubber in the mold for vulcanization, vulcanizing said rubber, subjecting the rubber to torsional stress by moving said members relative to each other while in the mold before the residual heat of vulcanization is dissipated, retaining the rubber in this stressed condition, and subjecting said mold and assembly to additional heat for further treatment of the rubber while in this stressed condition.

20. The method of reducing creep in an assembly comprising rubber interposed between and adhered to spaced opposed relatively movable members, the steps of locating the members and rubber in the mold for vulcanization, vulcanizing said rubber, subjecting the rubber to tension stress by moving said members relative to each other while in the mold before the residual heat of vulcanization is dissipated, retaining the rubber in this stressed condition, and subjecting said mold and assembly to additional heat for further treatment of the rubber while in this stressed condition.

21. The method of reducing creep in an assembly comprising rubber interposed between and adhered to spaced opposed and relatively movable members, the steps of locating the members and rubber in the mold for vulcanization, vulcanizing said rubber, subjecting the rubber to compression stress by moving said members relative to each other while in the mold before the residual heat of vulcanization is dissipated, retaining the rubber in this stressed condition, and subjecting said mold and assembly to additional heat for further treatment of the rubber while in this stressed condition.

JOHN P. TRUSCOTT.

REFERENCES CITED

The following references are of record in the file of this patent:

UNITED STATES PATENTS

| Number | Name | Date |
| --- | --- | --- |
| 2,019,888 | Bostwick | Nov. 5, 1935 |
| 2,029,060 | Cozzo | Jan. 28, 1936 |
| 2,222,732 | Winegar | Nov. 26, 1940 |
| 2,231,769 | Merrill | Feb. 11, 1941 |
| 2,327,113 | Krotz | Aug. 17, 1943 |